(12) United States Patent
Benjamin et al.

(10) Patent No.: US 9,158,075 B2
(45) Date of Patent: Oct. 13, 2015

(54) FIBER OPTIC CONNECTORS AND STRUCTURES FOR LARGE CORE OPTICAL FIBERS AND METHODS FOR MAKING THE SAME

(75) Inventors: Seldon David Benjamin, Painted Post, NY (US); Michael de Jong, Colleyville, TX (US); Radawan Hall, Granite Falls, NC (US); Micah Colen Isenhour, Lincolnton, NC (US); Dennis Michael Knecht, Hickory, NC (US); James Phillip Luther, Hickory, NC (US); Randy LaRue McClure, Corning, NY (US)

(73) Assignee: Corning Incorporated, Corning, NY (US)

(*) Notice: Subject to any disclaimer, the term of this patent is extended or adjusted under 35 U.S.C. 154(b) by 646 days.

(21) Appl. No.: 12/901,692

(22) Filed: Oct. 11, 2010

(65) Prior Publication Data

US 2011/0091165 A1 Apr. 21, 2011

Related U.S. Application Data

(60) Provisional application No. 61/299,091, filed on Jan. 28, 2010, provisional application No. 61/251,911, filed on Oct. 15, 2009, provisional application No. 61/299,105, filed on Jan. 28, 2010, provisional application No. 61/251,924, filed on Oct. 15, 2009.

(51) Int. Cl.
| | |
|---|---|
| *G02B 6/36* | (2006.01) |
| *G02B 6/38* | (2006.01) |
| *G02B 6/02* | (2006.01) |
| *G02B 6/25* | (2006.01) |

(52) U.S. Cl.
CPC ............ *G02B 6/382* (2013.01); *G02B 6/02033* (2013.01); *G02B 6/25* (2013.01); *G02B 6/3887* (2013.01); *G02B 6/3825* (2013.01); *G02B 6/3849* (2013.01); *G02B 6/3858* (2013.01)

(58) Field of Classification Search
None
See application file for complete search history.

(56) References Cited

U.S. PATENT DOCUMENTS

| | | | |
|---|---|---|---|
| 4,582,392 A | 4/1986 | Williams et al. | ............. 350/96.2 |
| 5,080,460 A | 1/1992 | Erdman et al. | |
| 5,081,694 A | 1/1992 | Rhoese | |
| 5,208,887 A * | 5/1993 | Grinderslev | ..................... 385/81 |
| 5,233,677 A | 8/1993 | Winslow | .......................... 385/89 |
| 5,553,181 A | 9/1996 | vanWoesik | ..................... 385/85 |
| 5,862,282 A * | 1/1999 | Matsuura et al. | ................ 385/86 |
| 6,033,124 A | 3/2000 | Lesueur et al. | .................. 385/53 |
| 6,174,091 B1 | 1/2001 | Herrmann | ........................ 385/81 |
| 6,249,631 B1 | 6/2001 | LeVey et al. | ................... 385/134 |

(Continued)

FOREIGN PATENT DOCUMENTS

| | | | |
|---|---|---|---|
| CN | 1134690 | 1/1996 | |
| EP | 0347118 | 3/1994 | ............... G02B 6/38 |

*Primary Examiner* — Tina Wong
(74) *Attorney, Agent, or Firm* — Svetlana Z. Short

(57) ABSTRACT

Fiber optic connectors and other structures that can be easily and quickly prepared by the craft for termination and/or connectorization in the field are disclosed. More specifically, the fiber optic connectors and other structures disclosed are intended for use with glass optical fibers having a large core. In one embodiment, the fiber optic connector includes a ferrule having a bore sized to receive an optical fiber and a buffer layer at a front end face of the ferrule. Methods of making the fiber optic connectors and other structures are also disclosed. The methods disclosed allow "rough cutting" of the optical fibers with a buffer layer thereon by the craft.

21 Claims, 15 Drawing Sheets

(56) References Cited

U.S. PATENT DOCUMENTS

| | | | |
|---|---|---|---|
| 6,379,055 B1 | 4/2002 | Uken | 385/75 |
| 6,443,628 B1 | 9/2002 | Horie et al. | 385/73 |
| 6,663,293 B2* | 12/2003 | Lampert et al. | 385/78 |
| 6,702,478 B2 | 3/2004 | Inagaki et al. | 385/72 |
| 6,786,648 B2* | 9/2004 | Rief et al. | 385/80 |
| 6,848,837 B2* | 2/2005 | Gilligan | 385/80 |
| 7,241,056 B1 | 7/2007 | Kuffel et al. | 385/60 |
| 7,306,376 B2* | 12/2007 | Scerbak et al. | 385/76 |
| 7,377,703 B2 | 5/2008 | Weynant | |
| 7,534,050 B2* | 5/2009 | Kachmar | 385/55 |
| 2003/0081909 A1* | 5/2003 | Taira | 385/78 |
| 2003/0190135 A1* | 10/2003 | Moidu et al. | 385/138 |
| 2004/0109646 A1 | 6/2004 | Anderson et al. | |
| 2004/0258365 A1 | 12/2004 | Chudoba | |
| 2005/0286835 A1 | 12/2005 | Maxey | 385/55 |
| 2007/0172174 A1* | 7/2007 | Scerbak et al. | 385/76 |
| 2008/0304794 A1 | 12/2008 | Kato et al. | |
| 2008/0304795 A1 | 12/2008 | Oike et al. | |
| 2008/0304796 A1 | 12/2008 | Beshears et al. | |
| 2009/0087148 A1 | 4/2009 | Bradley et al. | 385/76 |
| 2009/0103870 A1 | 4/2009 | Solomon et al. | 385/98 |
| 2010/0290740 A1* | 11/2010 | Ohtsuka et al. | 385/60 |

* cited by examiner

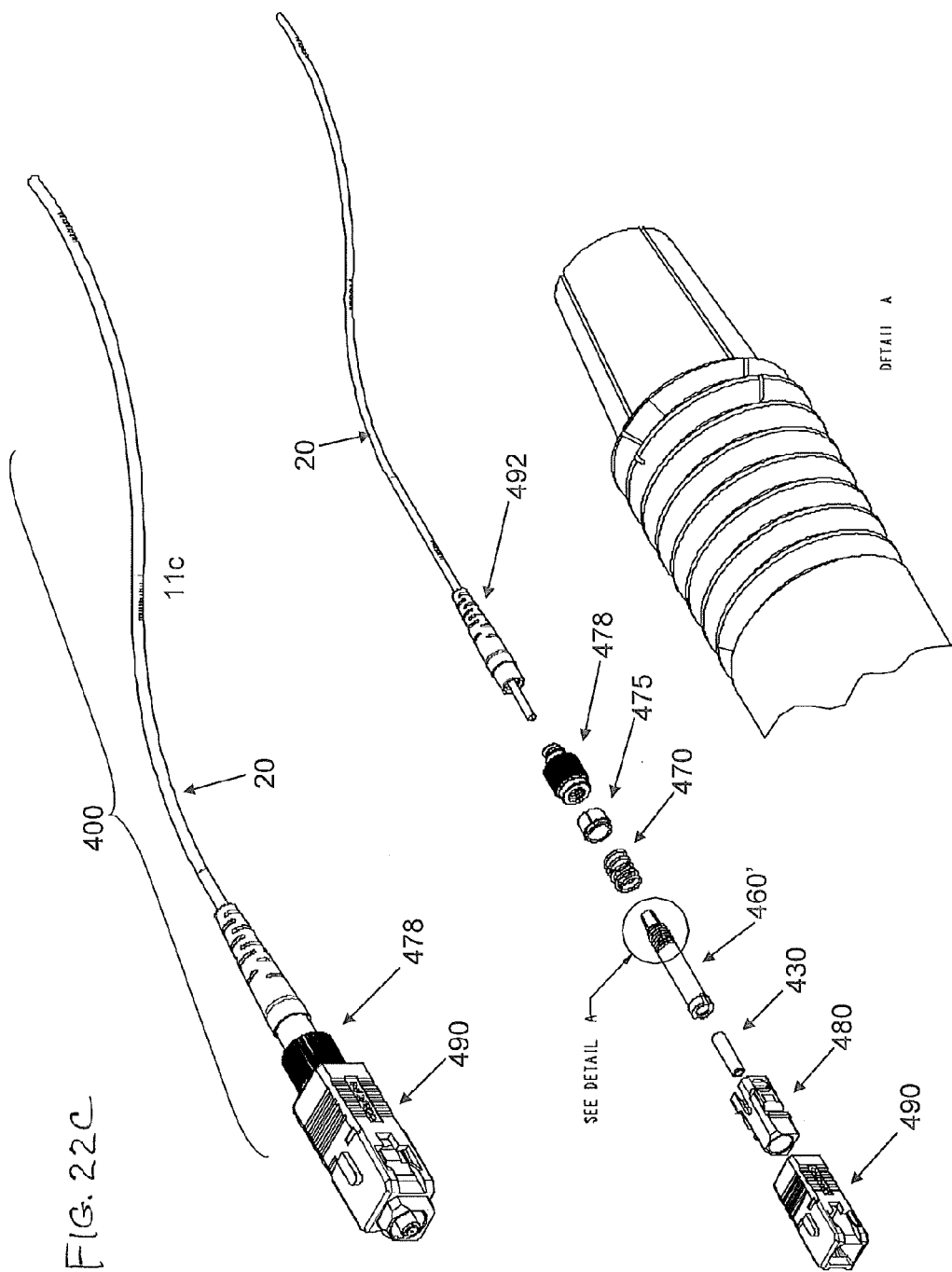

FIBER OPTIC CONNECTORS AND STRUCTURES FOR LARGE CORE OPTICAL FIBERS AND METHODS FOR MAKING THE SAME

This application claims the benefit of priority under 35 USC 119(e) of U.S. Provisional Application Ser. No. 61/299,091 filed on Jan. 28, 2010 and U.S. Provisional Application Ser. No. 61/251,911 filed on Oct. 15, 2009 and U.S. Provisional Application Ser. No. 61/299,105 filed on Jan. 28, 2010 and U.S. Provisional Application Ser. No. 61/251,924 filed on Oct. 15, 2009.

BACKGROUND

1. Field

The disclosure is directed to fiber optic connectors along with other structures and methods for making the same. More specifically, the disclosure is directed to fiber optic connectors and other structures for large core optical fibers and methods for making the same.

2. Technical Background

Optical fiber is increasingly being used for a variety of applications, including but not limited to broadband voice, video, and data transmission. Optical fibers may be formed from different types of materials such as plastic or glass depending on the application. Typically, plastic optical fibers (POF) have been used in short distance optical networks since they are relatively easy to terminate by untrained personnel. However, POF has limitations such as not being suitable for longer distance optical networks because the losses using POF increase dramatically with the transmission distance. On the other hand, glass optical fiber has extremely wide bandwidth and low noise operation with relatively low-losses over long distances. However, terminating or connectorizing conventional glass optical fibers is more complicated than terminating POF because it usually requires special cleaving tools and/or stripping tools for preparing the optical fibers. Moreover, conventional terminations or splicing of glass optical fibers may require a skilled technician and/or specialized equipment. For instance, fiber optic connectors for conventional glass optical fibers typically have a fine polish on the end face of the ferrule holding the glass optical fiber that is best accomplished in a factory setting with dedicated equipment. Field-terminated optical fiber connectors having a mechanical splice are available to the craft but are not typically used for short distance optical networks even though they are suitable for these applications.

Thus, there is an unresolved a need for a fiber optic connectors and other structures for use with glass optical fibers that are simple, cost-effective, reliable, easy to assemble, and which offers easy connection and disconnection for short distance optical fiber networks.

SUMMARY

Embodiments of the disclosure are directed to fiber optic connectors and other structures that can be easily and quickly prepared by the craft for termination and/or connectorization in the field. More specifically, the fiber optic connectors and other structures disclosed are intended for use with glass optical fibers having a large core. Methods of making the fiber optic connectors and other structures are also disclosed. The methods disclosed allow "rough cutting" of the optical fibers with a buffer layer thereon.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 18-22A depict explanatory steps for attaching the "rough cut" optical fiber having the buffer layer to the fiber optic connector of FIG. 13;

FIG. 22B depicts another embodiment of the fiber optic connector;

FIGS. 22C and 22D depicts the fiber optic connector of FIG. 22B;

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The embodiments and methods described herein are suitable for making optical connections for short distance optical networks. The concepts of the disclosure advantageously allow the simple, quick, and economical connection and disconnection of glass optical fibers. Reference will now be made in detail to the preferred embodiments, examples of which are illustrated in the accompanying drawings. Whenever possible, like reference numbers will be used to refer to like components or parts.

Figure 1:
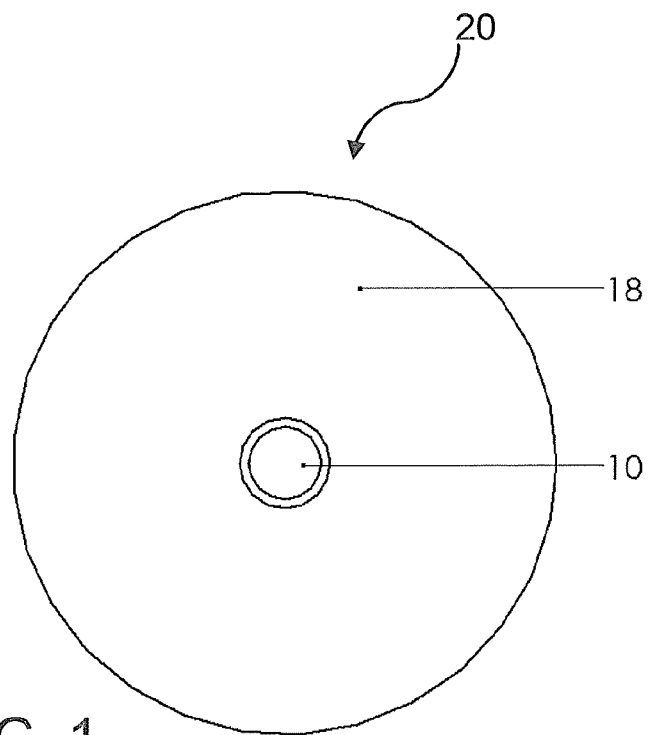
FIG. 1 is an end view of a large core optical fiber having a buffer layer after being "rough cut" for use in the fiber optic connectors disclosed herein.

FIG. 1 is an end view of an optical fiber 10 having a buffer layer 18 forming an optical fiber/buffer layer assembly 20 after being "rough cut" for use in the fiber optic connectors or other structures disclosed herein. Optical fiber 10 has a large glass core with a thin cladding layer such as a plastic cladding layer, which is then protected with a protective coating as described in more detail herein. Stated another way, optical fiber 10 is a glass-based optical fiber such as a silica-based optical fiber. As used herein, "a large glass core" means the optical fiber has a core with a diameter of 80 microns or greater. Using optical fibers with large glass core aids in the alignment of the abutting optical fiber cores. In this embodiment, optical fiber 10 has a core with a diameter of about 200 microns and cladding that is about 15 microns. The protective coating of optical fiber 10 generally covers the cladding and is also relatively thin such as about 10 microns. A polyvinylchloride (PVC) buffer layer 18 upcoats optical fiber 10 to 1.5 millimeters, but other suitable materials and/or dimension are possible for the buffer layer. Moreover, optical fiber 10 preferably has a concentricity error with buffer layer 18 that is 20 microns or less. The construction of optical fiber 10 with buffer layer 18 is advantageous for short distance optical fiber networks or other applications due to the simplicity in preparing the same for connectorization. By way of example, special cleaving tools and/or stripping tools are not required for preparing optical fiber 10. Instead, optical fiber 10 and buffer layer 18 can be "rough cut" in a single step using a common razor blade. By way of example, the protective coating inhibits the core of optical fiber 10 from being pushed off center during the cutting process with a simple tool such as a utility blade. Simply stated, the construction of the coating helps maintain the concentricity of optical fiber 10 with respect to buffer layer 18, thereby allowing a low-loss optical connection. Thus, preferably, the buffer layer remains on fiber during and after cutting, and does not need to be stripped.

Figure 2:
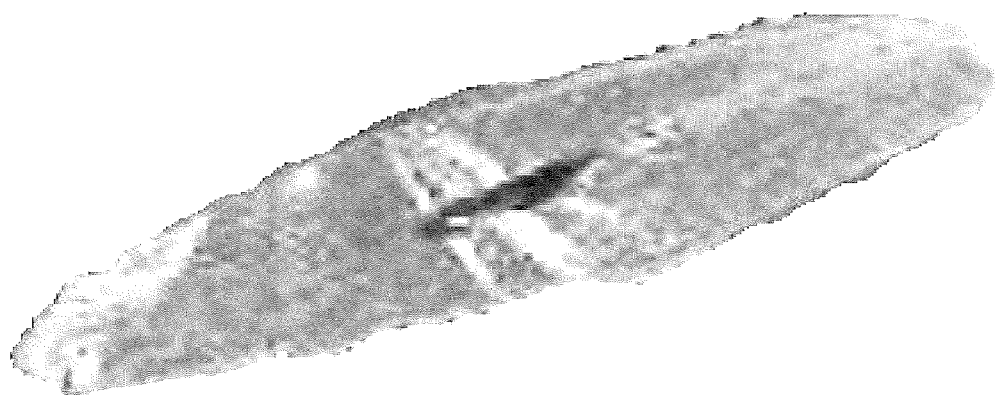
FIG. 2 is a contour representation of a "rough cut" optical fiber.
Figure 3:
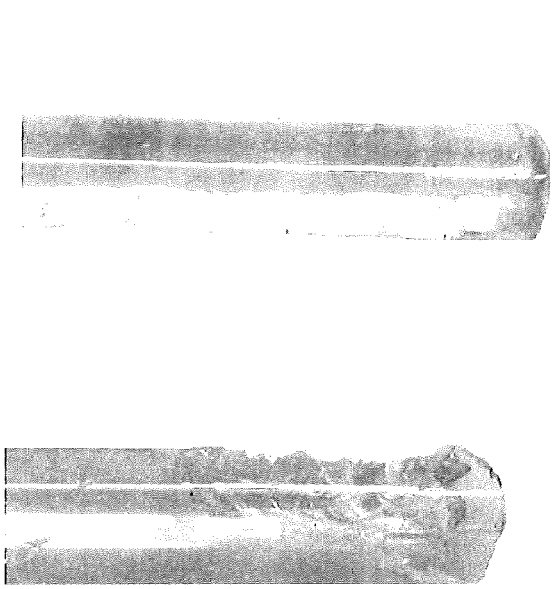
FIGS. 3A and 3B depicts a comparison between an optical fiber "rough cut" with a buffer layer disposed at the cut portion and an optical fiber "rough cut" without a buffer layer disposed at the cut portion.

FIG. 2 shows a contour representation of "rough cut" optical fiber 10 using a Keyence microscope with surface profile capacity. Optical fiber 10 was cleaved using a common utility blade as opposed to a precision cleaver as would be used when terminating an optical fiber used in typical telecommunication optical network. The surface of optical fiber 10 is multi-faceted as shown; however, it is not shattered. The construction of optical fiber 10 with buffer layer 18 allows "rough cutting." By way of example, FIG. 3 depicts a comparison between optical fiber 10 "rough cut" with buffer 18 thereon (picture A) and the optical fiber "rough cut" after the buffer layer was removed (picture B). Both optical fibers were "rough cut" with respective brand new utility blades. Buffer layer 18 has been removed from optical fiber 10 in picture A so the condition of optical fiber 10 thereunder can be viewed for comparison purposes with picture B. Specifically, picture A shows that optical fiber 10 is in relatively pristine condition compared with the optical fiber in picture B after "rough cutting". In other words, the optical fiber in picture B has more damage than the optical fiber 10 cut with the buffer layer 18 as shown in picture A. Fiber optic connectors and other structures disclosed herein use the rough cut optical fibers with the buffer layer 18 intact at the front end face of the optical fiber.

Simply stated, special tools and procedures are not required for connectorizing and/or splicing the rough cut optical fibers. Furthermore, the structures disclosed herein are also advantageous since they allow the use of high-quality glass optical fiber without requiring polishing to a fine finish as typically done for glass optical fibers having small optical fiber cores; however, the "rough cut" end face the optical fiber/buffer layer may be smoothed if desired. Consequently, an untrained person can quickly and easily make connections of suitable quality for optical networks while advantageously using glass optical fibers, instead, of using plastic optical fibers.

Figure 4:
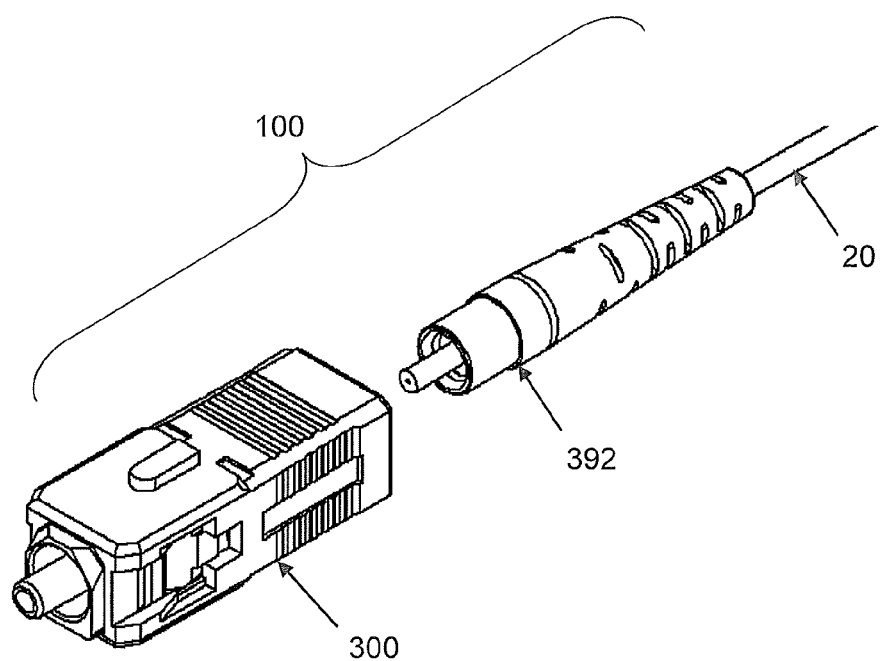
FIGS. 4-6 depict various views of a fiber optic connector having the optical fiber of FIG. 1 where the ferrule of the connector has a bore sized to receive the optical fiber and the buffer layer at a front end face of the ferrule.
Figure 5:
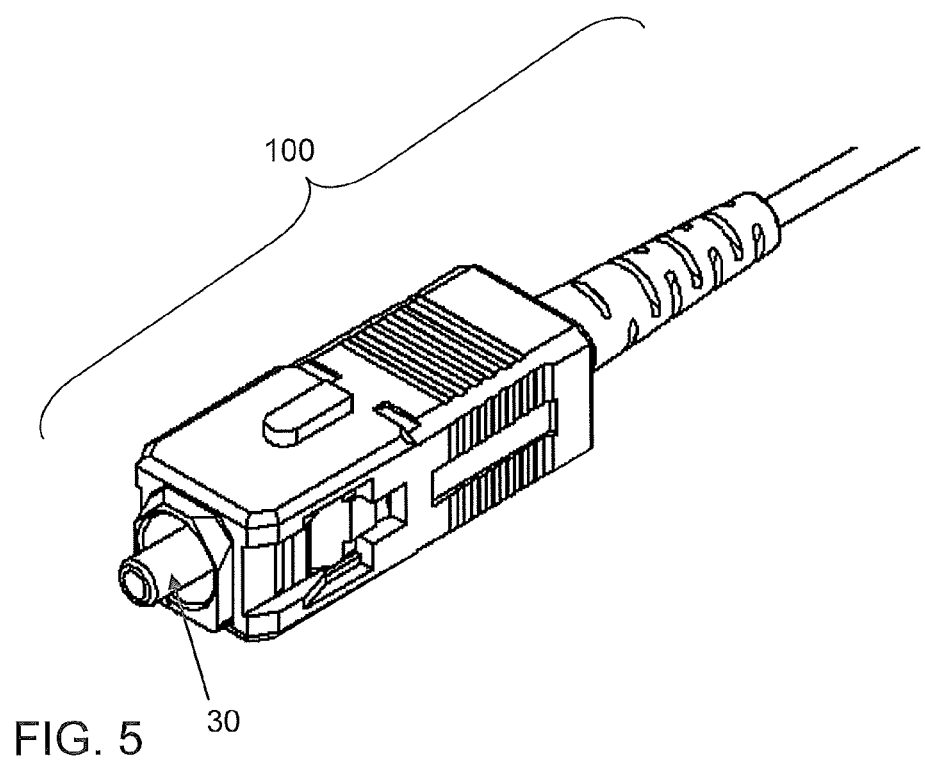
Figure 6:
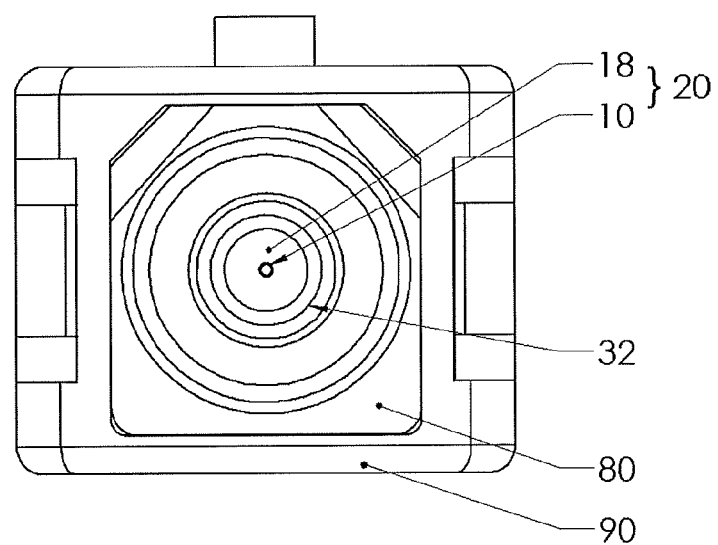

FIGS. 4-6 depict various views of a fiber optic connector 100. FIG. 4 shows a partially assembled view of fiber optic connector 100 and FIG. 5 shows an assembled fiber optic connector 100. Fiber optic connector 100 includes a ferrule 30 having a bore (not numbered) sized to receive the optical fiber 10 and buffer layer 18 at a front end face 32 of the ferrule 30 as best shown in FIG. 6. In other words, ferrule 30 has a bore that extends from a rear of the ferrule to a front (i.e., the front end face) of the ferrule 30 where the bore is sized to receive the rough cut optical fiber 10 with the buffer layer 18 at the front end face 32 of the ferrule 30. The bore of ferrule 30 has a diameter of 250 microns or greater at the front end face 32, but ferrules can have any suitable sized bore that is matched to the outer diameter of the buffer layer surrounding the optical fiber. Illustratively, the bore of ferrule 30 has a diameter slightly larger than 1.5 millimeters for receiving optical fiber 10 and buffer layer 18 having the outer diameter of 1.5 millimeters at the front end face 32 for abutting with another optical fiber. By way of example, other suitable bore sizes at the front end face 32 are 900 microns, 700 microns, 500 microns, but other sizes matched to the outer diameter of the buffer layer are possible.

Fiber optic connector 100 may include other suitable components. Illustratively, FIG. 6 depicts an end view of fiber optic connector 100 showing an outer housing 90 for aligning and/or latching the same and an inner housing 80 that cooperates with the outer housing 90. Further, fiber optic connectors may include one or more retaining structures for securing the optical fiber to the fiber optic connector. Preferably the retaining structure does not require the use of adhesives. In this embodiment, the optical fiber/buffer layer is secured with a crimp structure on the buffer layer 18, but other retaining structures are possible. Examples of other suitable retaining structures include a camming feature or other suitable structure for securing the optical fiber to the fiber optic connector. In still further embodiments, the retaining structure may be reversible, that is, the retention may be undone in case the optical fiber requires repositioning. For instance, the cam feature may be reversed to unclamp the optical fiber for repositioning the same within the fiber optic connector.

Figure 7:
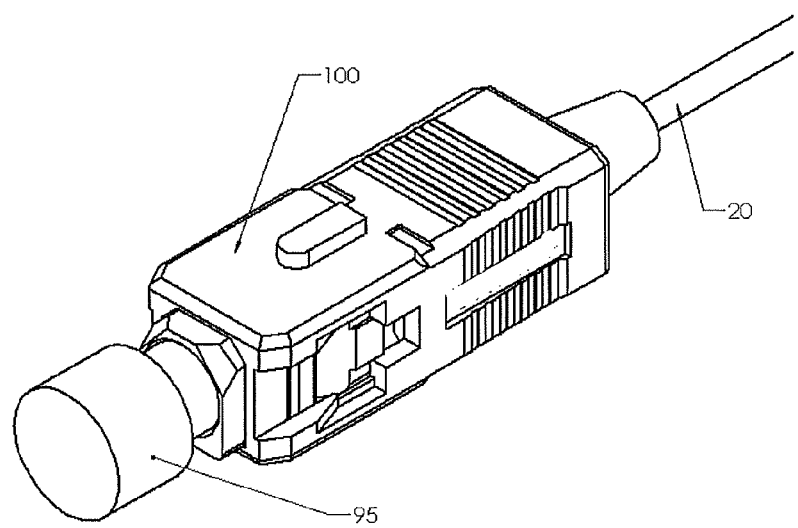
FIG. 7 depicts a fiber optic connector having a dust cap attached to the same that acts as a stop for optical fiber insertion.

Of course, fiber optic connectors can have other components and/or features. FIG. 7 depicts a fiber optic connector having a dust cap 95 attached to the same. Dust cap 95 may act as a stop for optical fiber insertion. In other words, during assembly dust cap 95 remains attached to ferrule 30 and the optical fiber/buffer layer is inserted until it abuts the dust cap 95 indicating that it inserted to the correct position. In further embodiments, dust cap 95 may be preloaded with an index-matching gel within the same so that when the optical fiber 10 abuts the same index-matching gel is applied to an end face of the optical fiber. Other suitable components include boots, springs, etc. Likewise, the concepts disclosed may be used with fiber optic connectors having any suitable configuration such as SC, FC, ST, LC or the like and the concepts may be used with multifiber connectors also.

Figure 8:
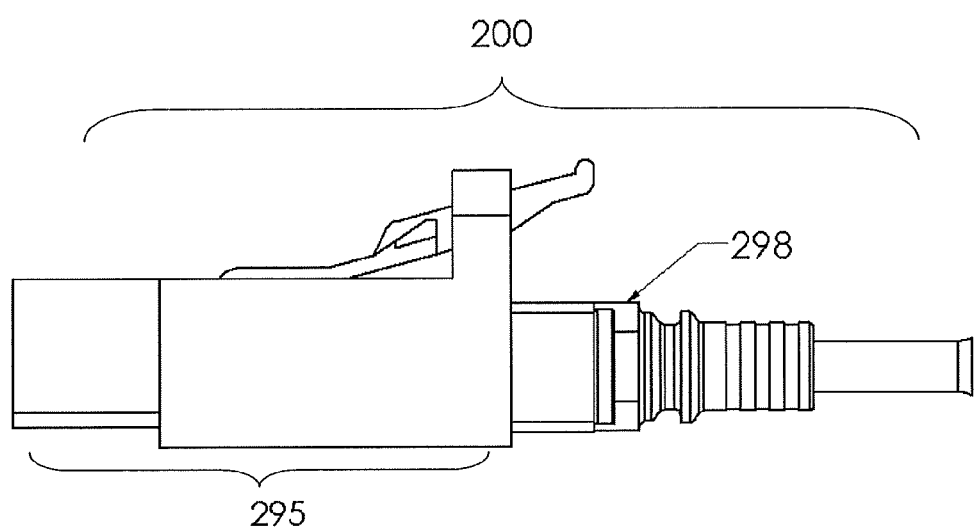
FIGS. 8-10 depict another fiber optic connector that does not require a ferrule for holding and centering the optical fiber having the buffer layer.
Figure 9:
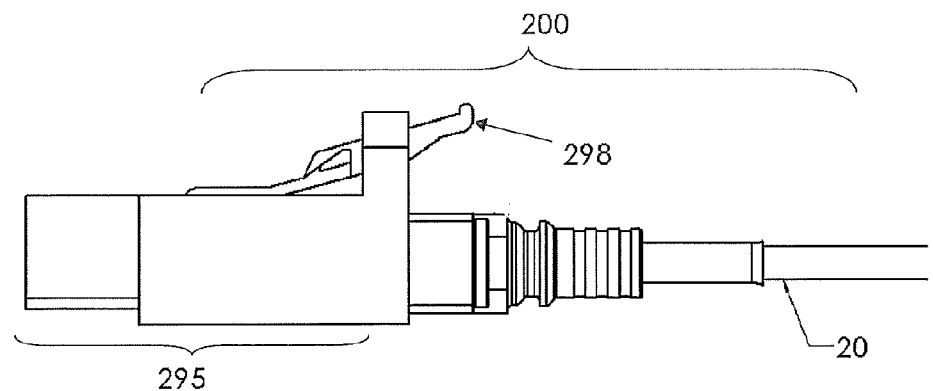
Figure 10:
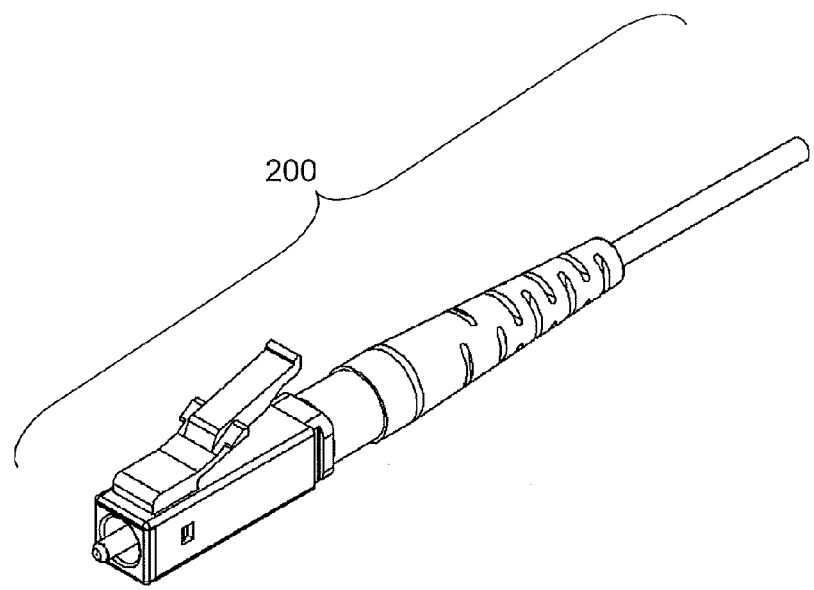

FIGS. 8-10 depict a fiber optic connector 200 suitable for connectorizing a large core optical fiber with a rough cut as discussed above, except fiber optic connector 200 does not require a ferrule for holding and centering the optical fiber/buffer layer. Instead, a body of fiber optic connector 200 has a portion with a retaining structure for securing an optical fiber and a front portion having a passageway sized to receive the optical fiber and buffer layer through a front end of the body. Thus, fiber optic connector 200 allows the optical fiber/buffer layer to extend to a mating front face of fiber optic connector 200. Specifically, FIG. 8 depicts an assembled fiber optic connector 200 before the optical fiber/buffer layer assembly 20 is attached and FIG. 9 depicts the optical fiber/buffer layer attached to fiber optic connector 200. FIG. 10 shows a completely assembled fiber optic connector 200 with a boot installed. Additionally, fiber optic connector 200 can include other suitable components and/or such as a dust cap, index-matching gel, one or more housings, springs, etc.

For instance, fiber optic connector 200 includes a dust cap 295 attached to the same. Dust cap 295 may act as a stop for optical fiber/buffer layer assembly 20 insertion as discussed. Further, dust cap 295 may be preloaded with an index-matching gel so that when the optical fiber 10 abuts the same index-matching gel is applied to an end face of the same. As shown, dust cap 295 is secured to fiber optic connector 200 using a cantilever latch 298. Consequently, when inserting the optical fiber/buffer layer assembly 20 to the proper location abutting the dust cap 295, the dust cap 295 is inhibited from being unintentionally displaced.

Figure 11:
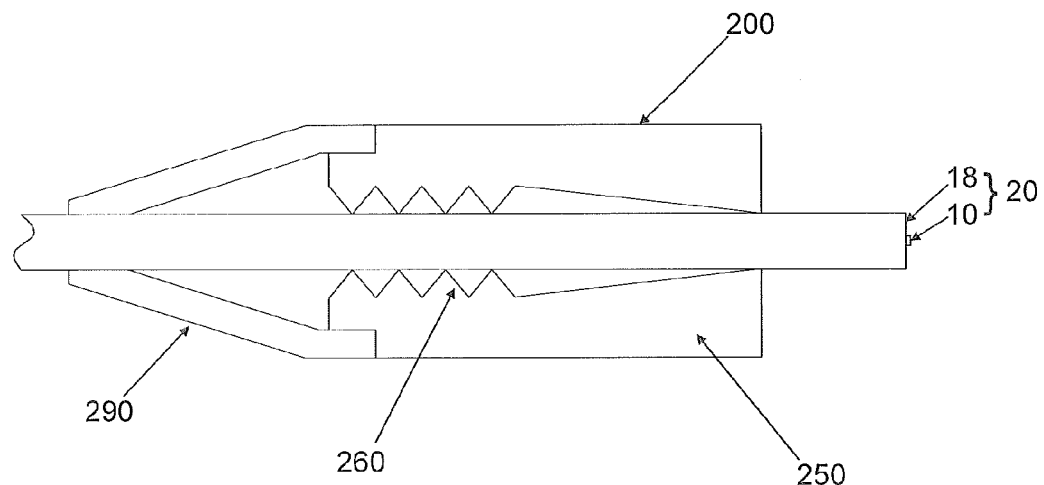
FIG. 11 schematically depicts the fiber optic connector of FIGS. 8-10.

FIG. 11 schematically depicts fiber optic connector 200 having a body 250 with a retaining structure 260 for securing the optical fiber/buffer layer assembly 20. More specifically, body 250 has a front portion (not numbered) having a passageway sized for receiving the optical fiber/buffer layer assembly 20 through a front end of body 250 as shown. Like fiber optic connector 100, the passageway of fiber optic connector 200 has a diameter of about 250 microns or greater. Retaining structure 260 of body 250 includes one or more cantilevered arms as shown. The retaining structure 260 is biased together onto the optical fiber/buffer layer assembly 20 using a suitable clamping structure such as a crimp, cam, threaded collar, boot, or the like. As shown in FIG. 11, boot 290 acts as the clamping structure for biasing the one or more cantilevered arms toward each other. Further, boot 290 may apply a forward biasing force to the optical fiber/buffer layer assembly 20 to maintain its position in the fiber optic connector. In other embodiments, a crimp band or the like could be placed either over or under the boot to increase the clamping force. In embodiments using a cam or threaded collar as the clamping structure, the retaining structure may be reversible to release the retaining structure from the optical fiber/buffer layer assembly 20 by reversing the cam or unscrewing the threaded collar.

Figure 12:
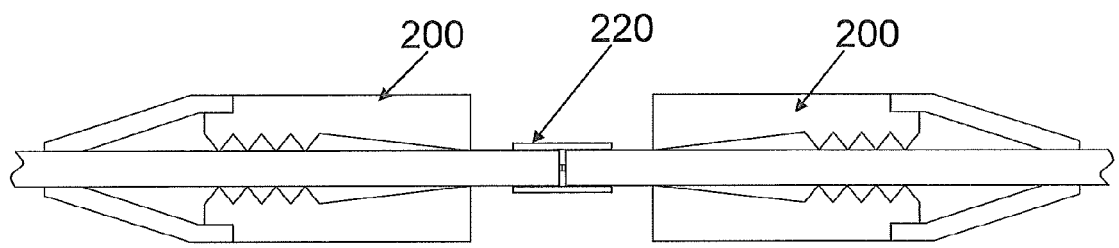
FIG. 12 schematically depicts the fiber optic connector of FIG. 11 being mated to another similar fiber optic connector using a simple adaptor.

FIG. 12 schematically depicts the fiber optic connector 200 of FIG. 11 being mated to another similar fiber optic connector 200 using an adaptor. One exemplary adaptor 220 is shown schematically as a simple tube that is sized for receiving optical fiber/buffer layer assembly 20 within respective ends, but the adaptor can have structure such as a housing and the like as known for mating and securing fiber optic connector with a suitable footprint such as a LC connectors. The adaptor 220 may contain index matching gel that becomes applied to end of fiber upon insertion of fiber into adaptor. (I.e., the gel has substantially the same index of refraction as the fiber's waveguiding portion) For example, greater than 1.0, preferably between 1.3 and 1.6 and more preferably between 1.4 and 1.5. An example of a common index-matching material is a low-viscosity index polymer with a molecular weight typically less than 30,000 Daltons to which is added a small amount of gelling agent, such as fumed silica or metal soap to make the gel phixotropic. Such materials are popular because they are inexpensive and do not require significant technical expertise to manufacture. Preferably the fibers are not attached to one another by an adhesive.

Figure 13:
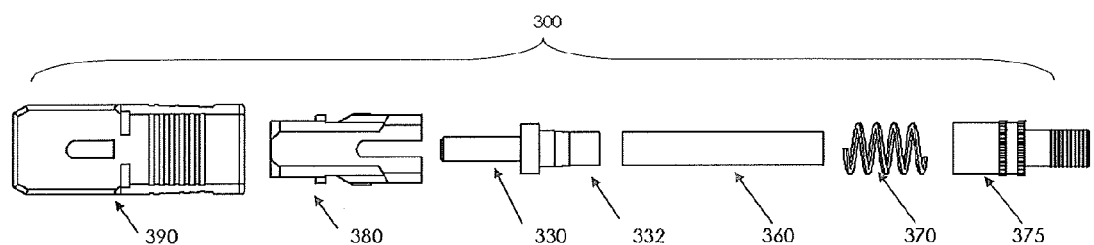
FIG. 13 depicts a partially exploded view of another fiber optic connector.
Figure 14:
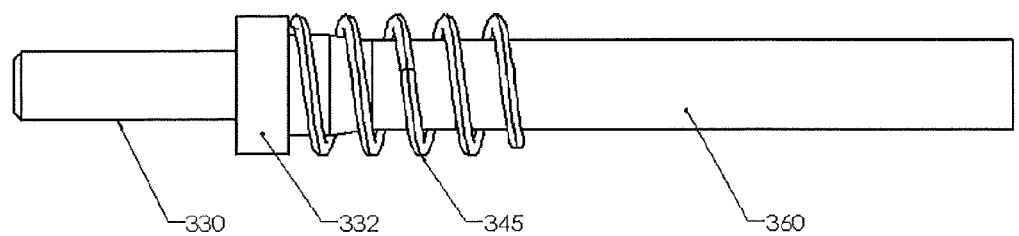
FIGS. 14-17 depict explanatory steps for assembling the components of the fiber optic connector of FIG. 13.
Figure 15:
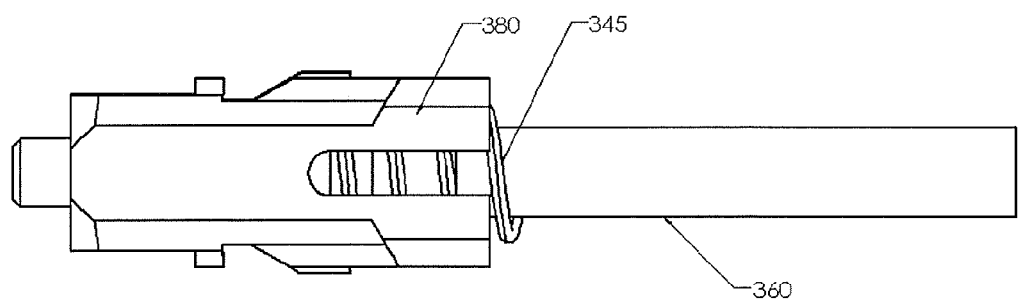
Figure 16:
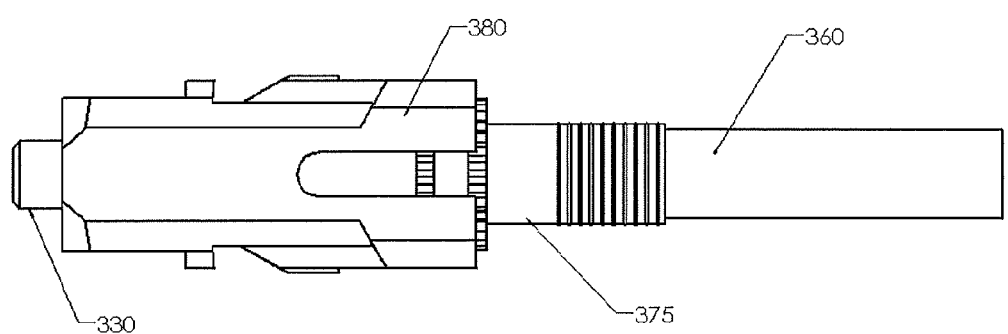
Figure 17:
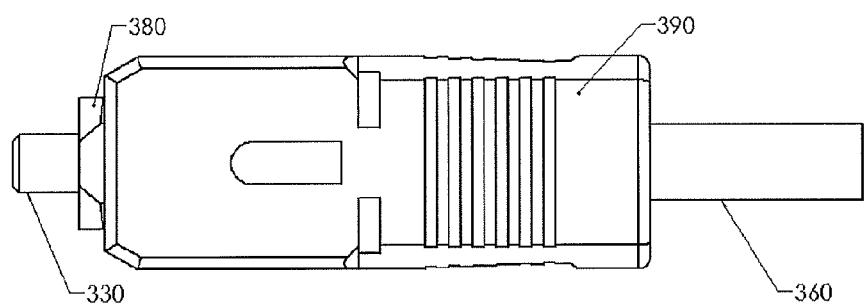

FIG. 13 depicts a partially exploded view of an explanatory SC fiber optic connector 300 using the disclosed concepts. As shown, fiber optic connector 300 includes a ferrule 330, a ferrule holder 332, a crimp body 360, a spring 370, a spring push 375, an inner housing 380, and an outer housing 390. Ferrule 330 has a bore sized to receive optical fiber/buffer layer assembly 20 at its front end face. Likewise the ferrule holder 332 has a bore sized to receive crimp body 360 therethrough. In this embodiment, crimp body 360 has a bore sized to receive optical fiber/buffer layer assembly 20 such as about 1.5 millimeters, but the bore may have other suitable sizes for receiving the same. The assembly of these components of fiber optic connector 300 is illustrated in FIGS. 14-17. More specifically, FIG. 14 shows ferrule 330 attached to ferrule holder 332 with crimp body 360 retained within the ferrule holder 332 and the spring 345 slid over the sub-assembly. Next, the sub-assembly of FIG. 14 is inserted into inner housing 380 as shown in FIG. 15 and then spring push 375 is slid over crimp body 360 to engage the rear portion of inner housing 380 until it is fully seated as shown in FIG. 16. Thereafter, outer housing 390 is attached over a portion of the inner housing 380 as shown in FIG. 17 and a dust cap with or without an index-matching gel may be secured to ferrule 330 if desired. The fiber optic connector assembly is ready for attaching the optical fiber/buffer layer assembly thereto.

Figure 18:
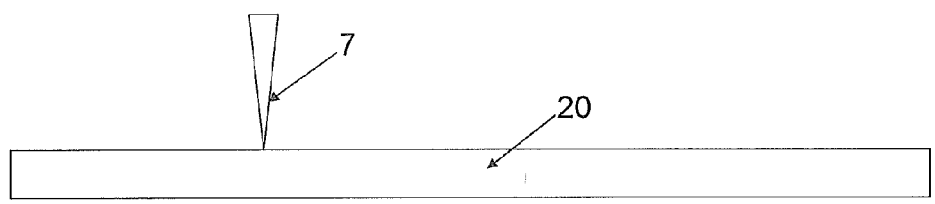
Figure 19:
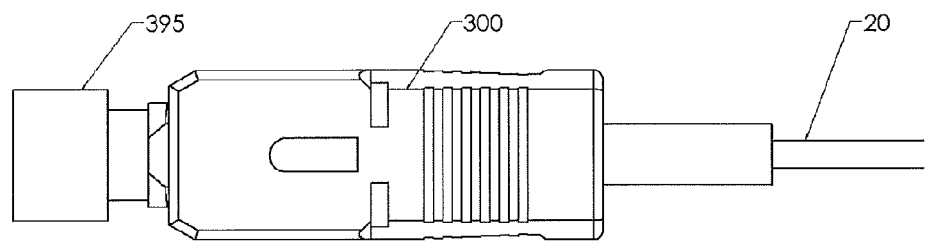

FIGS. 18-22A depict explanatory steps for attaching a "rough cut" optical fiber/buffer layer assembly 20 to the sub-assembly of FIG. 17. FIG. 18 is a schematic representation of optical fiber/buffer layer assembly 20 being "rough cut" with a utility blade. "Rough cutting" of the optical fiber/buffer layer assembly 20 may be accomplished by merely pushing a blade 7 down and through the assembly in a suitable fashion and does not require any special tools. Thereafter, the "rough cut" optical fiber/buffer layer assembly 20 is inserted into the assembled fiber optic connector 300. As shown, in FIG. 19, the optical fiber/buffer layer assembly 20 is inserted until it abuts a dust cap 395. In this embodiment, dust cap 395 has a reservoir that includes an index-matching gel (not visible) therein, thereby applying the index-matching gel to the end face of the optical fiber/buffer layer assembly 20. Thereafter, the optical fiber/buffer layer assembly 20 is secured to the fiber optic connector.

Figure 20:
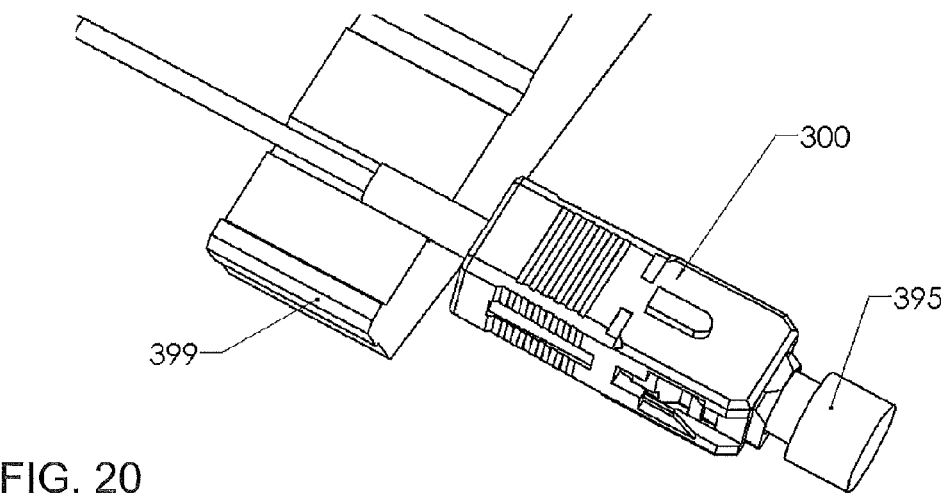
Figure 21:
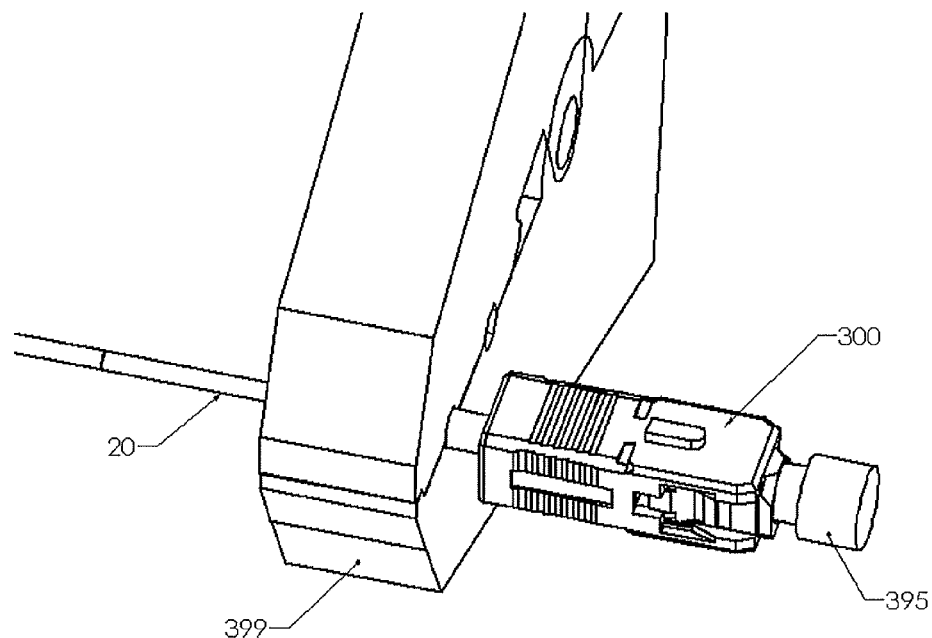

FIGS. 20 and 21 depict optical fiber/buffer layer assembly 20 being secured to fiber optic connector 300 using a crimp tool 399. FIG. 20 shows fiber optic connector 300 with optical fiber/buffer layer assembly 20 inserted therein is placed into the jaw of crimp tool 399. Thereafter, crimp tool 399 is actuated to deform crimp body 360 about the buffer layer 18, thereby securing optical fiber/buffer layer assembly 20 to fiber optic connector 300. Then the fiber optic connector 300 is removed from crimp tool 399 and a boot 392 that was previously threaded onto optical fiber/buffer layer assembly 20 may be slid onto the rear portion of fiber optic connector 300, thereby forming the assembly shown in FIG. 22A. Although this embodiment uses a crimp tool 399 for securing optical fiber/buffer layer assembly 20 to fiber optic connector 300 other embodiments with different retention structures may not require a crimp tool for securing the same. For instance, the retention structure could use a threaded compression nut for biasing one or more cantilever arm together to clamp the optical fiber/buffer layer assembly 20. Other embodiments may use a cam structure that secures the optical fiber/buffer layer assembly 20 by rotating the cam.

Figure 22A:
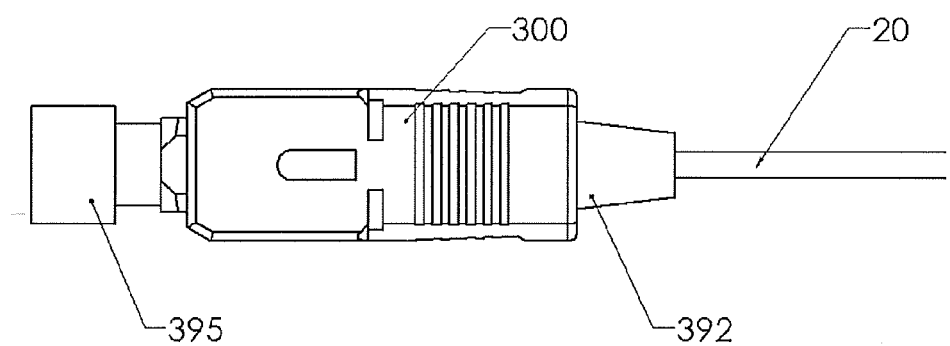
Figure 22D:
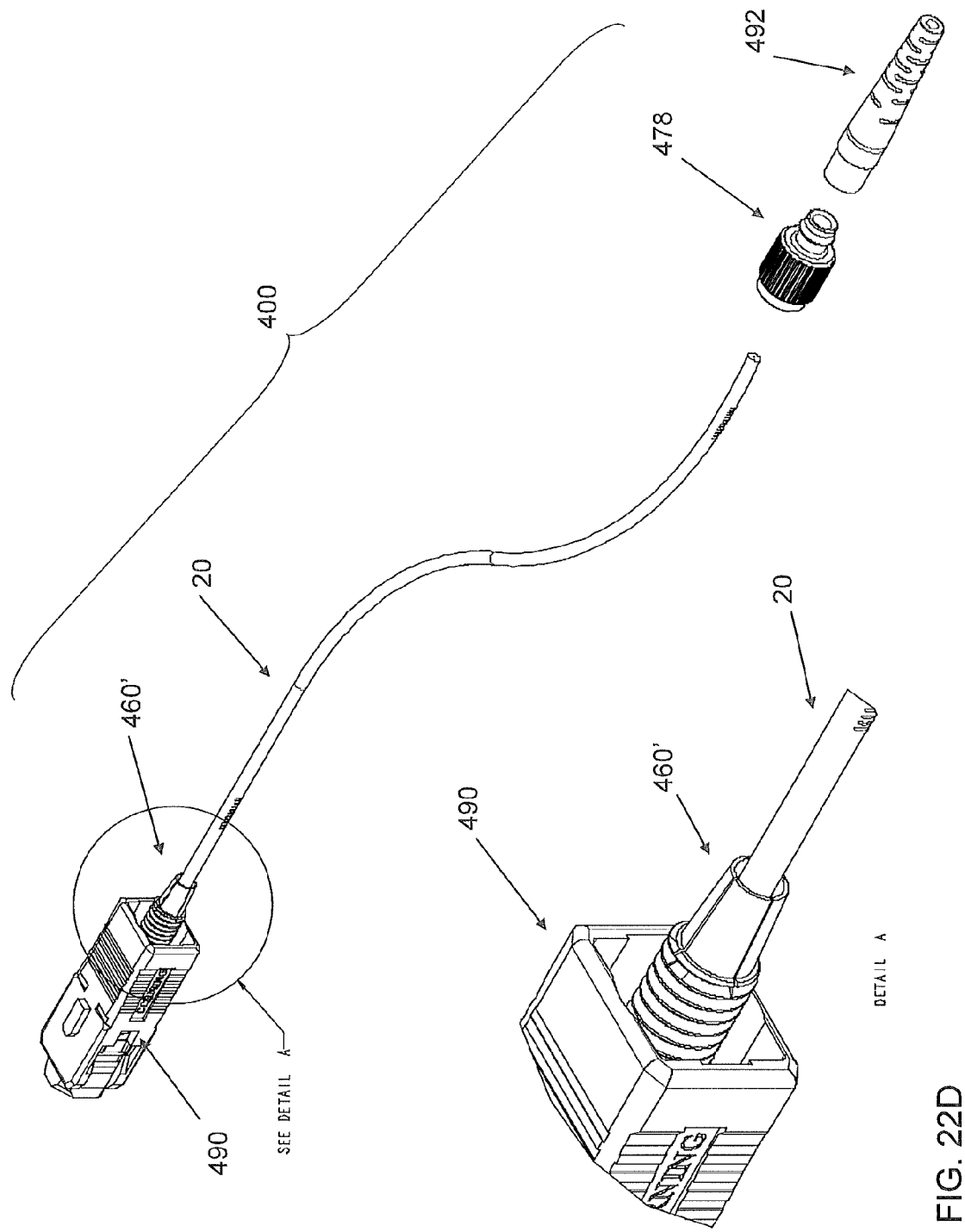

One embodiment of the fiber optics connector retention structure that utilises a threaded compression nut for biasing one or more cantilever arm together to clamp the optical fiber/buffer layer assembly 20 is shown, for example in FIGS. 22B-D. More specifically, FIG. 22C illustrates the assembled connector FIG. 22B depicts a partially exploded view of an explanatory SC fiber optic connector 400. As shown, fiber optic connector 400 includes a ferrule 430, a combined ferrule holder and cantilever arm structure 460', a threaded compression nut 478, a spring 470, a spring push 475, an inner housing 480, and an outer housing 490. Ferrule 430 has a bore sized to receive optical fiber/buffer layer assembly 20 at its front end face. In this embodiment, cantilever arm structure 460' has at least one bore 460'A sized to receive optical fiber/buffer layer assembly 20 such as about 1.5 millimeters, but the bore may have other suitable sizes for receiving the same. The assembly of these components of fiber optic connector 400 is illustrated in FIG. 22D. Ferrule 430 is attached to cantilever arm structure 460' and the spring 445 slid over the sub-assembly. Next, the sub-assembly is inserted into inner housing 480 and then spring push 475 is slid over crimp body 460 to engage the rear portion of inner housing 480 until it is fully seated. Thereafter, outer housing 490 is attached over a portion of the inner housing 480 and a dust cap with or without an index-matching gel may be secured to ferrule 430 if desired. a threaded compression nut 478 may also be installed on, cantilever arm structure 460'. The fiber optic connector assembly is ready for attaching the optical fiber/buffer layer assembly 20 thereto. FIGS. 22 C-D depict exemplary steps for attaching a "rough cut" optical fiber/buffer layer assembly 20 to fiber optic connector 400. FIG. 18 is a schematic representation of optical fiber/buffer layer assembly 20 being "rough cut" with a utility blade. "Rough cutting" of the optical fiber/buffer layer assembly 20 may be accomplished by merely pushing a blade 7 down and through the assembly in a suitable fashion and does not require any special tools. Thereafter, the "rough cut" optical fiber/buffer layer assembly 20 is inserted into the assembled fiber optic connector 400. As shown, in FIG. 19, the optical fiber/buffer layer assembly 20 is inserted until it abuts a dust cap 395. In this embodiment, dust cap 395 has a reservoir that includes an index-matching gel (not visible) therein, thereby applying the index-matching gel to the end face of the optical fiber/buffer layer assembly 20. Thereafter, the optical fiber/buffer layer assembly 20 is secured to the fiber optic connector by tightening the threaded compression nut which compresses the cantilever arm structure onto the fiber optic cable 20 to secure fiber optic cable 20.

The methods for making a fiber optic connector assembly may include the steps of providing a ferrule having a bore therethrough and a front end face and providing an optical fiber having a core and a protective layer. "Rough cutting" the optical fiber/buffer layer assembly, if necessary, and then inserting the optical fiber into the bore of the ferrule so that the core and the protective layer extend to the front end face of the ferrule. The method of making the fiber optic assembly may further include the step of abutting the optical fiber to a dust cap that includes an index-matching gel. Likewise, the method may include the step of securing the optical fiber to the connector, securing a boot to the connector, and/or the other steps described herein such as assembling the fiber optic connector. As described herein, preferably, the fiber includes a buffer layer and is cleaved or cut while retaining the buffer layer, and the cleaved or cut fiber is inserted in a connector without stripping the buffer layer. Preferably, the method includes at least one of the following: no polishing of fiber end surface, no stripping of any coatings; no use and/or no curing of adhesive(s). Preferably the cut or cleaved fiber is placed into an optical connector and anther fiber in also placed in the connector, such that the cut or cleaved fiber is optically coupled to the other fiber. Preferably, a quantity (less than 0.5 ml, preferably less than 0.1 ml) of oil or index matching gel described above is placed between the two fibers. Thus, the fibers are not attached to one another by an adhesive. Therefore, the method of making the fiber optic assembly preferably includes: no polishing of fiber end surface, no stripping of any coatings; and no curing of adhesive(s).

Alternative, methods for making a fiber optic connector assembly may includes the steps of providing a body having a portion with a retaining structure and a passageway therethrough such as schematically depicted in FIG. 11; providing an optical fiber having a core and a protective layer; "rough cutting" the optical fiber/buffer layer assembly, if necessary; and inserting the optical fiber into the passageway of the body so that the core and the protective layer extend to a mating front face of the fiber optic connector. The method of making the fiber optic assembly may further include the steps of abutting the optical fiber to a dust cap that includes an index matching gel, securing the optical fiber to the connector, securing a boot to the connector, and/or the other steps described herein such as assembling the fiber optic connector.

Figure 23:
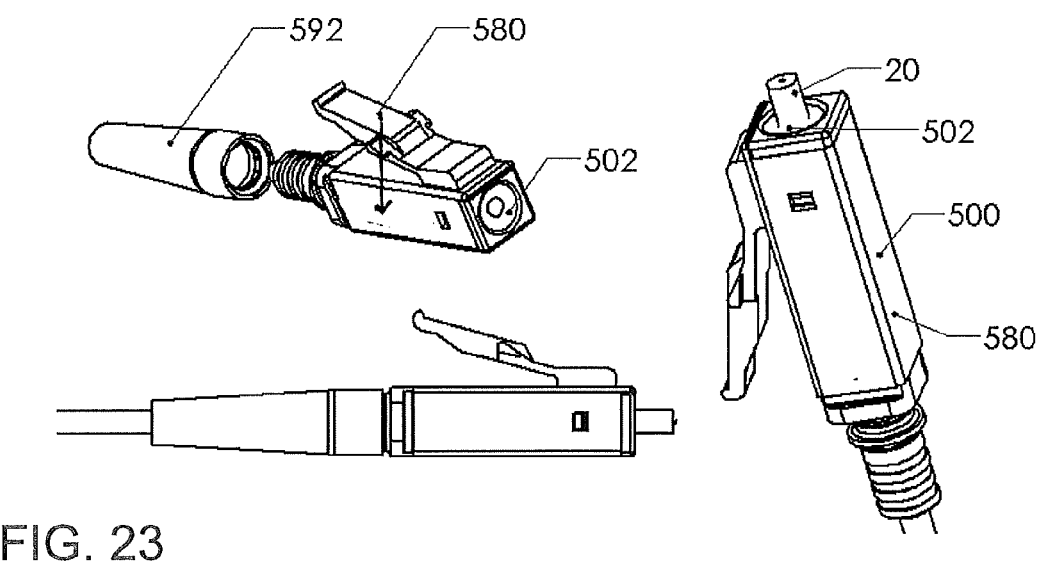
FIG. 23 depicts various views of yet another fiber optic connector.

FIG. 23 depicts various views of still another fiber optic connector 500. Fiber optic connector 500 includes a housing 580 that including a grommet insert 502 at the front end for centering the optical fiber/buffer layer assembly 20 therein. Fiber optic connector 500 is advantageous since it can accommodate different sized optical fiber/buffer layer assemblies simply by using a different sized grommet insert 502 within housing 580. By way of example, a first grommet insert 502 can have a bore sized for a 1.5 millimeter OD and a second grommet insert 502 may have a bore sized for a 900 micron OD, thereby allowing the use of different sized optical fiber/buffer layer assemblies 20 with fiber optic connector 500. Additionally, fiber optic connector 500 includes a boot 592 that applies a forward biasing force to the optical fiber/buffer layer assembly 20. Stated another way, boot 592 allows insertion of the optical fiber/buffer layer assemblies with 20 into the boot 592 toward the ferrule, but inhibits withdrawal of the same from the boot 592. Boot 592 may include any suitable structure such as flexible internal fingers that provide the forward biasing force/movement in a forward direction and inhibit rearward displacement. Additionally, other fiber optic connectors disclosed herein can use a similar boot that applies a forward biasing force. As shown, optical fiber/buffer layer assembly 20 extends beyond the front end face of optical fiber connector 500 for mating with a like optical fiber.

Figure 24:
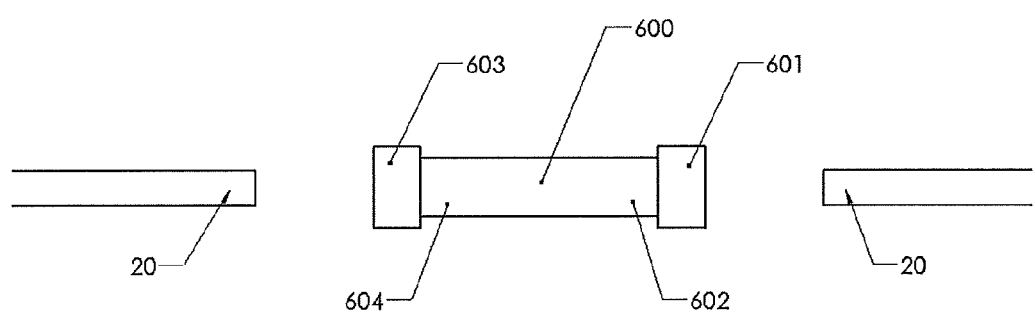
FIG. 24 depicts an explanatory mechanical splice body.

FIG. 24 depicts an explanatory mechanical splice body 600 that includes a tube (not numbered) having a having a passageway (not numbered) between a first end 602 and a second end 604. The passageway is sized for receiving a first optical fiber/buffer layer assembly 20 into the first end 602 and a second optical fiber/buffer layer assembly 20 into the second end 604. The mechanical splice body 600 also includes a first retaining structure 601 for securing the first optical fiber/buffer layer assembly 20 and a second retaining structure 603 for securing the second optical fiber/buffer layer assembly 20. The retaining structures of mechanical splice body 600 may have any suitable structure such as crimp feature or a camming feature for securing the optical fiber/buffer layer assembly. Additionally, the retaining structure may be reversible, thereby allowing repositioning of the optical fiber/buffer layer assembly.

Figure 25:
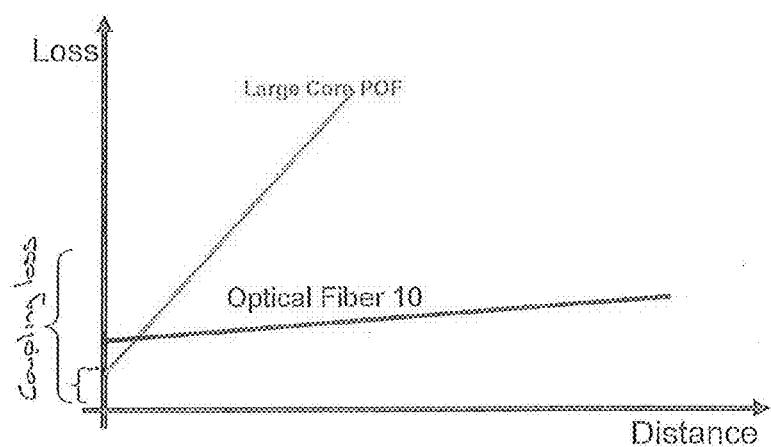
FIG. 25 graphically depicts the loss for glass optical fibers having large cores compared with conventional plastic optical fibers.

FIG. 25 graphically depicts the losses vs. distance for the glass optical fiber 10 with a large core compared with a conventional plastic optical fiber (POF). As shown, the y-intercept represents the initial coupling loss for the different optical waveguides and the slope of the curves represent the increased loss based on transmission distances (i.e., as distance increases the optical loss increases). As shown, plastic optical fiber (POF) is represented by curve 700 and optical fiber 10 is represented by curve 704. As shown, curve 704 has a coupling loss in a similar range as the coupling loss of the POF represented by curve 700 (i.e., similar y-intercepts); however, the total loss is dramatically larger for the POF compared with optical fiber 10. Consequently, optical fiber 10 yields a much improved optical performance compared with POF for all but the shortest distance links.

One embodiment of optical fiber 10 includes: (i) a multi-mode silica based glass core having a diameter between 80-300 μm and an index of refraction n1; (ii) a cladding surrounding the core having a thickness ≤20 μm and index of refraction n2<n1 with a delta index of refraction between the core and cladding being defined as n1-n2. The cladding includes (a) fluorine doped silica with a relative index of refraction delta <0; or (b) a polymer with relative index of refraction delta <0; (iii) a protective coating having a Young's modulus greater than 700 MPa, a thickness ≤15 μm, and an index of refraction index of refraction n3>n2. Further, optical fiber 10 includes a buffer layer 18 as discussed herein.

A more specific variation of optical fiber 10 may include a glass core with a graded index with a 175 μm to 225 μm diameter where the cladding is a fluorinated polymer and has a thickness between 10 μm to 15 μm, and the protective coating having the a thickness of ≤10 μm. Additionally, the buffer layer 18 may have a shore D hardness of at least 60.

One advantage of the disclosed optical fibers is that the protective coating minimizes the fiber movement inside the buffer layer during "rough cutting" and also during subsequent use in the fiber optic connector, due to strong adhesion of the protective coating to both the cladding and the buffer layer. Yet another advantage the optical fibers disclosed is that the protective coating prevents the optical fiber core from moving off-center during "rough cutting", thus minimizing coupling losses when this fiber is coupled to another optical fiber. Yet another advantage of the optical fibers disclosed is that the protective coating also provides protection during handling and storage if the buffer layer is not applied at the same time as the protective coating.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A fiber optic connector, comprising:
a ferrule having a bore, the bore extending from a rear of the ferrule to a front of the ferrule, wherein the bore is sized to receive an optical fiber and a buffer layer at a rear end face of the ferrule and at front end face of the ferrule to allow allowing the optical fiber and the buffer layer to extend from the rear end of the ferrule to the front end of the ferrule; and
a housing; and
a multi-mode glass optical fiber having core of at least 80 microns in diameter, a protective coating with a Young's modulus greater than 700 MPa and a thickness of 15 microns or less surrounding said core, a buffer layer with a shore D hardness of at least 60 surrounding said coating, wherein the optical fiber extends into the ferrule so that the optical fiber with the buffer layer thereon extends from the rear end of the ferrule to the front face of the ferrule through the length of the ferrule defined by the rear end face of the ferrule and the front end face of the ferrule, and no fiber portion situated inside said connector is stripped of the buffer layer.

2. The fiber optic connector of claim 1, wherein the bore has a diameter of about 250 microns or greater at the front end face.

3. The fiber optic connector of claim 1, wherein the optical fiber is a silica-based optical fiber.

4. The fiber optic connector of claim 1, wherein the optical fiber is not polished to a fine finish.

5. The fiber optic connector according to any of the preceding claims, said optic connector further including a retaining structure for securing the optical fiber to the fiber optic connector.

6. The fiber optic connector of claims 1, further including a retaining structure defining a crimp feature or a camming feature, or a cantilever arm structure with threaded compression nut, for securing the optical fiber to the fiber optic connector.

7. The fiber optic connector of claims 1, further including a retaining structure, wherein the retention feature is reversible.

8. The fiber optic connector of claim 1, further including a dust cap that acts as a stop for insertion of the optical fiber.

9. The fiber optic connector of claim 1 further including a dust cap having an index matching gel therein.

10. The fiber optic connector of according to claim 1 and further including a latching mechanism.

11. The fiber optic connector of claim 1, further including a ferrule holder, a crimp body, a spring, and a spring push, and a boot.

12. A method for making a fiber optic connector assembly, comprising:
providing a ferrule having a bore therethrough and a front end face;
providing a multimode glass optical fiber having a core of at least 80 microns in diameter and a protective layer surrounding the core, said protective layer having a Young's modulus greater than 700 MPa and a thickness of 15 microns or less; and
inserting the optical fiber into the bore of the ferrule so that the core and the protective layer extend from a rear end of the ferrule through the length of the ferrule to the front end face of the ferrule such that no fiber portion situated inside said connector is stripped of the buffer layer.

13. The method of claim 12, wherein optical fiber is a silica-based optical fiber and not polished.

14. The method of claim 12, the step of inserting further including abutting the optical fiber to a dust cap that includes an index matching gel.

15. The method of claim 12, further including the step of securing the optical fiber to the connector.

16. The method of claim 12, the fiber optic connector further including a latching mechanism.

17. The method according to claim 12, further comprising inserting said cleaved or cut fiber in a connector without stripping its buffer layer.

18. The method according to claim 17, wherein said method includes at least one of the following: no polishing of fiber end surface, no stripping of any coatings; no curing of adhesive(s).

19. The method according to claim 17, wherein said method includes placing said cut or cleaved fiber into an optical connector; placing anther fiber in said connector, wherein said cut or cleaved fiber is optically coupled to said another fiber.

20. The method according to claim 17, including placing a quantity of gel between said fibers.

21. The method according to claim 20, wherein said fibers are not attached to one another by an adhesive.

* * * * *